(12) United States Patent
MacIver et al.

(10) Patent No.: US 11,493,048 B2
(45) Date of Patent: Nov. 8, 2022

(54) MODULAR LABYRINTH SEAL SYSTEM USABLE WITH ELECTRIC SUBMERSIBLE PUMPS

(71) Applicant: ZiLift Holdings, Limited, Aberdeen (GB)

(72) Inventors: Ivor MacIver, Aberdeenshire (GB); Richard Greenfield, Aberdeenshire (GB)

(73) Assignee: ZiLift Holdings, Limited, Aberdeen (GB)

( * ) Notice: Subject to any disclaimer, the term of this patent is extended or adjusted under 35 U.S.C. 154(b) by 513 days.

(21) Appl. No.: 16/578,127

(22) Filed: Sep. 20, 2019

(65) Prior Publication Data

US 2020/0072357 A1    Mar. 5, 2020

Related U.S. Application Data

(63) Continuation of application No. PCT/GB2018/050915, filed on Apr. 5, 2018.

(Continued)

(51) Int. Cl.
*F04D 13/10* (2006.01)
*F04D 13/08* (2006.01)
(Continued)

(52) U.S. Cl.
CPC ............ *F04D 13/10* (2013.01); *E21B 43/128* (2013.01); *E21B 43/38* (2013.01); *F04D 13/08* (2013.01);
(Continued)

(58) Field of Classification Search
CPC ........ E21B 43/128; E21B 43/38; F04D 13/10; F04D 13/086; F04D 13/08; F04D 29/08; F04D 29/086; H02K 5/132
See application file for complete search history.

(56) References Cited

U.S. PATENT DOCUMENTS 7,367,400 B1 * 5/2008 Howell ................. H02K 5/132
166/66.4
7,654,315 B2 * 2/2010 Du ......................... E21B 4/003
166/66.4

(Continued)

FOREIGN PATENT DOCUMENTS

WO    2017/024067 A1    2/2017

OTHER PUBLICATIONS

Examination Report, Gulf Cooperation Council Application No. GC 2018-35097 dated May 16, 2020.

(Continued)

*Primary Examiner* — Peter J Bertheaud
(74) *Attorney, Agent, or Firm* — Richard A. Fagin

(57) ABSTRACT

A labyrinth section for a submersible pump includes an outer housing having a coupling sealingly engaged at each longitudinal end of the outer housing. An inner tube is sealingly engaged at each end to one of the couplings to define a sealed annular space. A plurality of labyrinth tube sections are disposed in the annular space, each comprising labyrinth tubes engaged with end plates. A plurality of the labyrinth tube sections enable movement of fluid through the labyrinth tubes, spaces external to the labyrinth tubes and between the end plates to fill the annular space. One of the labyrinth tube sections constrains fluid to move only within the labyrinth tubes and wherein the inner tube between the end plates of the one of the labyrinth tubes comprises a fluid port into an interior of the inner tube.

15 Claims, 9 Drawing Sheets

Related U.S. Application Data

(60) Provisional application No. 62/482,706, filed on Apr. 7, 2017.

(51) Int. Cl.
  *E21B 43/12* (2006.01)
  *H02K 5/132* (2006.01)
  *E21B 43/38* (2006.01)
  *F04D 29/08* (2006.01)

(52) U.S. Cl.
  CPC ........... *F04D 13/086* (2013.01); *H02K 5/132* (2013.01); *F04D 29/08* (2013.01); *F04D 29/086* (2013.01)

(56) References Cited

U.S. PATENT DOCUMENTS

| | | | |
|---|---|---|---|
| 9,777,560 B2* | 10/2017 | Tetzlaff | F04D 29/126 |
| 2011/0236233 A1* | 9/2011 | Merill | F04B 17/03 |
| | | | 417/410.1 |
| 2014/0069629 A1* | 3/2014 | McCann | E21B 43/128 |
| | | | 166/66.4 |
| 2015/0023805 A1 | 1/2015 | Pyron et al. | |
| 2016/0076550 A1* | 3/2016 | Collins | F04D 13/10 |
| | | | 277/336 |

OTHER PUBLICATIONS

International Search Report and Written Opinion, International Application No. PCT/GB2018/050915 dated Jun. 8, 2018.
Examination Report, Gulf Cooperation Council Application No. GC 2018-35097 dated Jan. 23, 2020.

\* cited by examiner

MODULAR LABYRINTH SEAL SYSTEM USABLE WITH ELECTRIC SUBMERSIBLE PUMPS

CROSS REFERENCE TO RELATED APPLICATIONS

Continuation of International Application No. PCT/GB2018/050915 filed Apr. 5, 2018. Priority is claimed from U.S. Provisional Application No. 62/482,706 filed Apr. 7, 2017. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

BACKGROUND

Some examples relate to a labyrinth seal for a submersible pump, an electrical submersible pump, and/or a method for pumping fluid.

This disclosure relates to the field of submersible well pumps, such as electric submersible pumps (ESPs). More specifically, the disclosure relates to labyrinth type seal sections that enable dielectric fluid to be maintained at well ambient pressure while substantially excluding well fluid from entering components of the ESP requiring exclusion of well fluid.

Pressure within the electrical submersible pump (ESP) is at atmospheric pressure prior to the ESP being inserted into a wellbore. Since well pressure often significantly exceeds atmospheric pressure, the pressure within the ESP should be equalized to well pressure, thereby reducing pressure differential across the ESP housing and seals. A hazard of differential pressure is that well fluid could breach seals and leak into the motor of the ESP. This is of special concern with regard to the motor, where the well fluids, which are electrically conductive and may have solid particles therein could create electrical short circuits and mechanically damage the motor. A protector communicates well fluid pressure to the motor fluid pressure thereby minimizing pressure differential and prolonging seal life. To perform such function, the protector contains a pressure compensation device to act as a barrier to well fluid entering the upper drive train (i.e., components proximate to and including the motor) while still transmitting the pressure from the well to upper drive train. A protector also has a tortuous fluid path that slows down the migration of well fluid through the protector to reduce the chance of well fluid entering the upper drivetrain through any leak in the pressure compensating device or mechanical seal.

SUMMARY

A labyrinth section for a submersible pump according to one aspect of the present disclosure comprises an outer housing having a coupling sealingly engaged to the outer housing at each longitudinal end of the outer housing. An inner tube is sealingly engaged at each end to one of the couplings to define a sealed annular space between the outer housing and the inner tube. A plurality of labyrinth tube sections is disposed in the sealed annular space; each labyrinth tube section comprises labyrinth tubes engaged with end plates. A plurality of the labyrinth tube sections enable movement of fluid through the labyrinth tubes and spaces external to the labyrinth tubes and between the end plates so as to fill the sealed annular space. One of the labyrinth tube sections constrains fluid to move only within the labyrinth tubes and wherein the inner tube between the end plates of the one of the labyrinth tubes comprises a fluid port into an interior of the inner tube.

Some embodiments may further comprise an isolation valve at each longitudinal end of the outer housing and in fluid communication with a labyrinth tube at each longitudinal end of the labyrinth tube sections, the isolation valves opened to fill the section with dielectric fluid in the annular space and in the labyrinth tubes. In some embodiments, the isolation valves are closable to enable connection of the section to a protector and/or to a motor without introducing air into the annular space or the labyrinth tubes. In some embodiments, the isolation valves are operable by rotating a shaft having a cam in contact with an operating rod associated with each isolation valve. In some embodiments, the shaft comprises a keyway for an operating tool.

In some embodiments, each longitudinal end of the section is coupled to one of a submersible pump protector, a submersible pump or a submersible pump motor.

Another aspect of the disclosure relates to an electric submersible pump, comprising a motor connected by a transmission to a pump. A segmented housing encloses the motor and the pump. A protector may be disposed between the motor and the pump, the protector comprising a labyrinth seal section, the labyrinth seal section comprising a plurality of labyrinth tube sections disposed in an annular space between a part of the segmented housing and an inner tube, wherein at least one of the labyrinth tube sections is configured to cause fluid flow within labyrinth tubes and within the annular space external to the labyrinth tubes.

Some embodiments may further comprise an isolation valve at each longitudinal end of the labyrinth seal section and in fluid communication with a labyrinth tube at each longitudinal end of the labyrinth seal section, the isolation valves opened to fill the labyrinth seal section with dielectric fluid in the annular space and in the labyrinth tubes. In some embodiments, the isolation valves are closable to enable connection of the section to the protector and/or to the motor without introducing air into the annular space or the labyrinth tubes. In some embodiments, the isolation valves are operable by rotating a shaft having a cam in contact with an operating rod associated with each isolation valve. In some embodiments, the shaft comprises a keyway for an operating tool.

In some embodiments, the labyrinth tube sections comprise integrally formed labyrinth tubes and longitudinal end plates.

An electric submersible pump according to another aspect of the present disclosure comprises a motor connected by a transmission to a pump. A segmented housing encloses the motor and the pump. A protector is disposed between the motor and the pump. The protector comprises a labyrinth seal section. The labyrinth seal section comprises a plurality of labyrinth tube sections disposed in an annular space between a part of the segmented housing and an inner tube. At least one of the labyrinth tube sections is configured to cause fluid flow within labyrinth tubes and within the annular space external to the labyrinth tubes.

Some embodiments further comprise an isolation valve at each longitudinal end of the labyrinth seal section and in fluid communication with a labyrinth tube at each longitudinal end of the labyrinth seal section. The isolation valves may be opened to fill the labyrinth seal section with dielectric fluid in the annular space and in the labyrinth tubes.

In some embodiments, the isolation valves are closable to enable connection of the labyrinth seal section to the protector and/or to the motor without introducing air into the annular space or the labyrinth tubes.

In some embodiments, the isolation valves are operable by rotating a shaft having a cam in contact with an operating rod associated with each isolation valve.

In some embodiments, the shaft comprises a keyway for an operating tool.

In some embodiments, the labyrinth tube sections comprise integrally formed labyrinth tubes and longitudinal end plates.

A method for pumping fluid according to another aspect of the disclosure includes rotating a motor connected by a transmission to a pump, the motor and the pump disposed in a housing. The housing comprises a protector disposed between the motor and the pump. The protector comprises a labyrinth seal section including a plurality of labyrinth tube sections disposed in an annular space between a part of the segmented housing and an inner tube. The method comprises moving dielectric fluid from at least one of the labyrinth tube sections into an interior of the inner tube to cool components of the transmission disposed within the inner tube.

Some embodiments further comprise opening an isolation valve at each longitudinal end of the labyrinth seal section and in fluid communication with a labyrinth tube at each longitudinal end of the labyrinth seal section to fill the labyrinth seal section with dielectric fluid in the annular space and in the labyrinth tubes.

In some embodiments, the isolation valves are closable to enable connection of the section to the protector and/or to the motor without introducing air into the annular space or the labyrinth tubes.

In some embodiments, operating the isolation valves comprises rotating a shaft having a cam in contact with an operating rod associated with each isolation valve.

In some embodiments, the shaft comprises a keyway for an operating tool.

Other aspects and advantages of the present disclosure will be apparent from the following description and appended claims.

BRIEF DESCRIPTION OF THE DRAWINGS

FIGS. 4A, 4B and 4C show another example embodiment of a labyrinth seal section.

DETAILED DESCRIPTION

Figure 1:
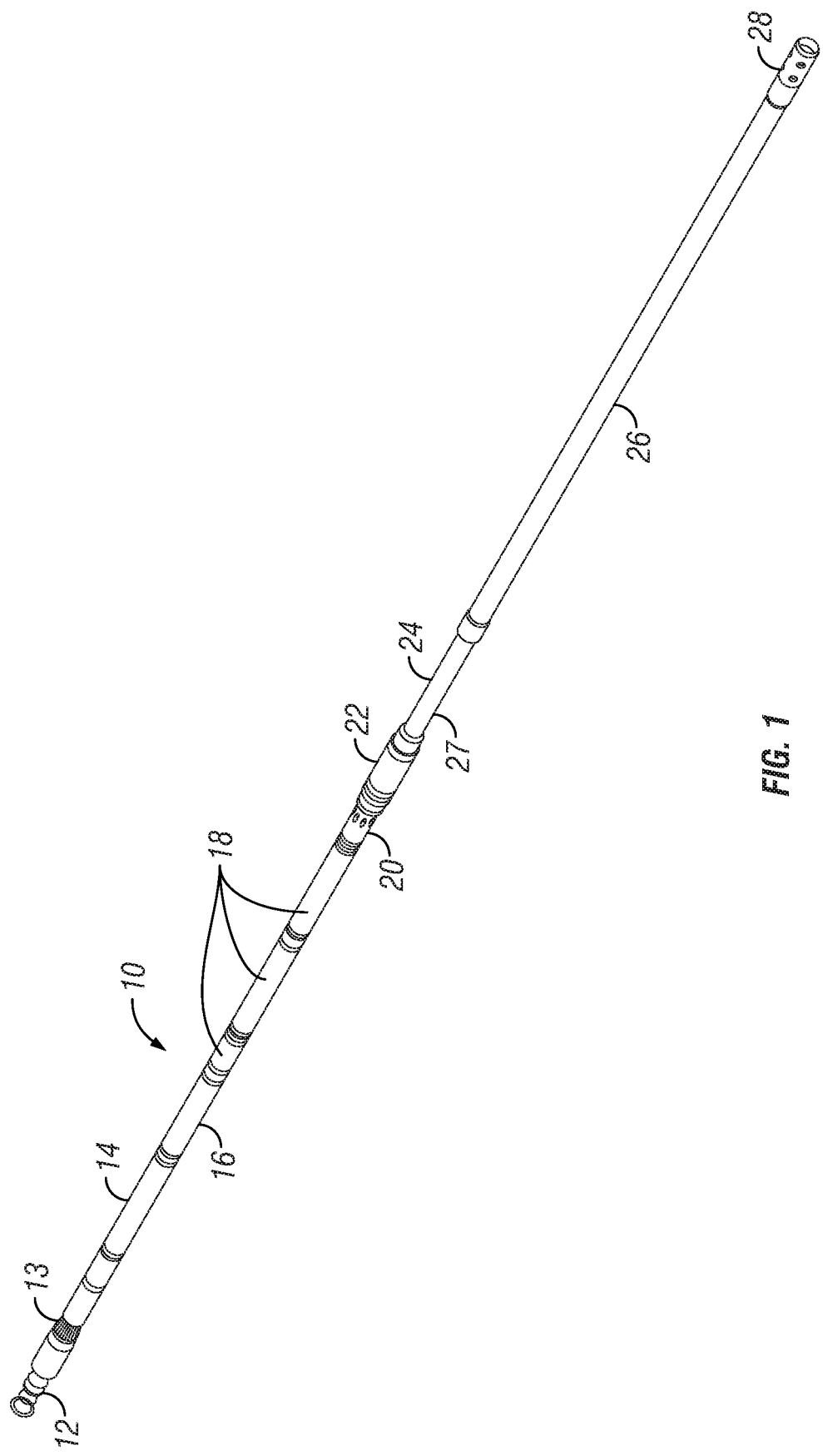
FIG. 1 shows an example embodiment of an electric submersible pump (ESP) system.

FIG. 1 shows an example embodiment of an ESP system 10 that may be conveyed into a well (not shown) using, for example and without limitation, jointed tubing, wireline, slickline or coiled tubing. The ESP system 10 may include an upper or "top" sub 12 that is configured to make connection to an end of one of the foregoing conveyance devices for movement into and out of the wellbore. A lower end of the ESP system 10 may include a "muleshoe" sub 28. The muleshoe sub 28 may be added below a pump 26 to provide protection while running into the well during deployment, and to provide a mounting location for a pump (ESP) intake memory gauge. In addition, the muleshoe sub 28 may provide a suitable location for inner bore sealing as part of a well barrier control mechanism. Both a single shot sealing option, and a pressure responsive valve with multiple stable positions may be considered as suitable example options for well sealing below the muleshoe sub 28. For purposes of this disclosure, the term "up" is intended to mean in a direction toward the outlet of a wellbore, while "down" is intended to mean in the opposite direction. Corresponding terms may include "upper end" and "lower end" with reference to various modules or sections that make up the ESP system 10.

The top sub 12 may be followed successively by a "star point sub" 13 and a motor 14, which in the present example may be an electric motor. The star point sub 13 may include one or more sensors and control devices related to operation of the ESP system 10 and the motor 14. The star point sub 13 may also be used to make electrical connection between a cable (not shown) and the motor 14. The motor 14 may be coupled at its lower end to an enclosed flexible shaft, a magnetic gear or any other rotational motion transmission 16. In the present example, the rotational motion transmission 16 accepts rotational input from the motor 14 high rotational speed and low torque, and transmits such rotation to a rotary pump 26. A protector 18 may be similar in operating principle to the protector ordinarily used in ESP systems and may be configured to exclude well fluid at existing well pressure and temperature from entering the motor 14. The protector 18 may also axially decouple the rotational motion transmission 16 and the motor 14 from axial and lateral loading generated by the rotary pump 26. Not shown in FIG. 1 for clarity is a flow shroud that diverts well fluid flow from the pump outlet so that it can travel in an annular space outside the ESP system 10 and be sealingly diverted into a tubing or coiled tubing and thence flow upwardly in the well (not shown).

The present example of ESP system 10 may be of modular design, and enable first lowering the rotary pump 26, including the muleshoe sub 28 and a flex sub 27 to enable relative axial deflection between the upper components, terminating at a field coupling sub 22 coupled to the upper end of a pump discharge sub 20, and thence coupled to a lower end of the protector 18 and the components described above. The rotary pump 26, the flex sub 27, the pump discharge sub 20 and the field coupling sub 22 may be inserted into the well first, to be followed by the foregoing described components beginning with the field coupling sub 22. The entire ESP system 10 may also be lowered into the well as an assembled unit. The rotary pump 26, the flex sub 27, the protector 18, the rotary motion transmission 16, the motor 14 and the star point sub 13 may each be enclosed in a respective pressure resistant housing, and such housings may be coupled by threads, locking rings or any other device known in the art for joining housings or housing segments together end to end.

Figure 2:
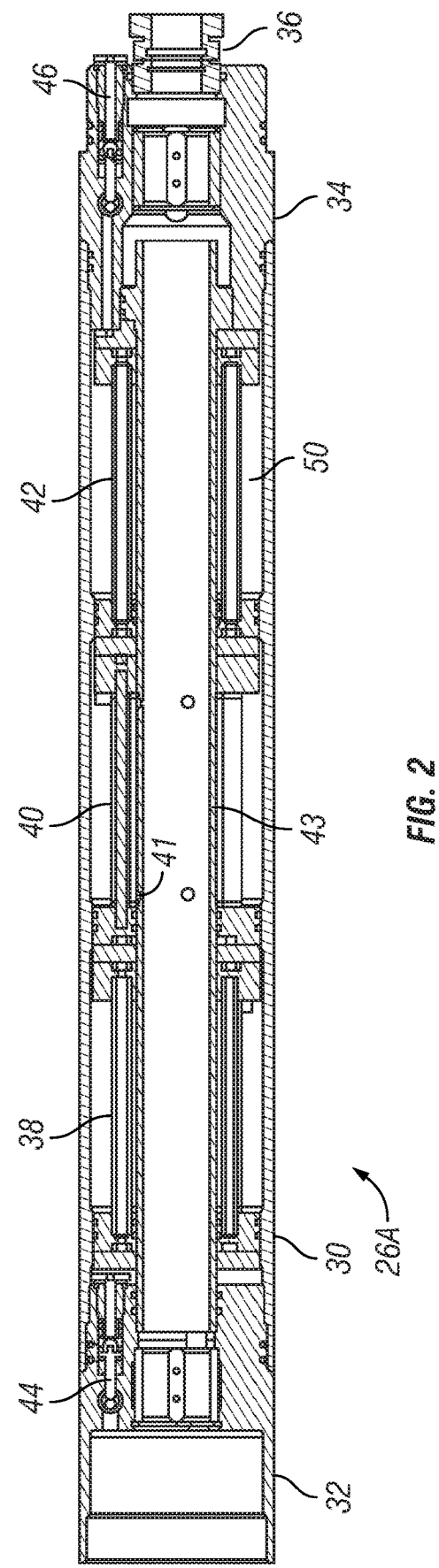
FIG. 2 shows a cross-section of part of the protector in the example embodiment of an ESP system as shown in FIG. 1.

FIG. 2 shows a labyrinth seal section 26A part of the protector (26 in FIG. 1). The labyrinth seal section 26A may comprise an outer housing 30 formed from steel or other high strength material. One end of the outer housing 30 may comprise an adapter sub 32 sealingly engaged with an interior surface of the outer housing 30. The adapter sub 32 may connect to part of the protector (26 in FIG. 1) on the motor end thereof. A connector sub 34 disposed at the opposite end of the outer housing 30 may be sealingly engaged with the outer housing 30. The connector sub 34 may comprise a mechanical seal 36 to enable sealed passage therethrough of part of the rotary motion transmission (explained with reference to FIG. 1) that transmits rotation from the motor (14 in FIG. 1) to the rotary pump (26 in FIG. 1).

The outer housing 30 defines an annular interior space or fluid chamber 50 between the outer housing 30 and an inner tube 43. The inner tube 43 may sealingly engage an interior bore of each of the adapter sub 32 and the connector sub 34 so as to define the interior fluid chamber 50. The interior fluid chamber 50 may be opened to fluid flow by disposing an isolation valve 44, 46, respectively, at each longitudinal end of the interior fluid chamber 50. The interior fluid chamber 50 may comprise a plurality of labyrinth tube sections. In the present example embodiment, there may be three labyrinth tube sections, shown at 38, 40 and 42, respectively. The labyrinth tube sections 38, 40, 42 provide a tortuous fluid flow path within the interior fluid chamber 50. The labyrinth tube sections, e.g., 38 in FIG. 3, may each comprise a plurality of tubes 38B sealingly engaged with respective end plates 38A.

During assembly of the labyrinth seal section 26A, the isolation valves 44, 46 may be opened, and dielectric fluid may be moved into the interior fluid chamber 50 and the labyrinth tube sections 38, 40, 42 from one end of the labyrinth seal section to the other. After filling, the isolation valves 44, 46 may be closed to prevent entry of air bubbles into the dielectric fluid while the labyrinth seal section 26A is assembled to the rest of the protector (26 in FIG. 1) and the motor (14 in FIG. 1). Once the labyrinth seal section 26A is assembled to the protector (26 in FIG. 1) and the motor (14 in FIG. 1), the foregoing may be filled with dielectric fluid and the isolation valves 44, 46 may be opened.

Figure 3:
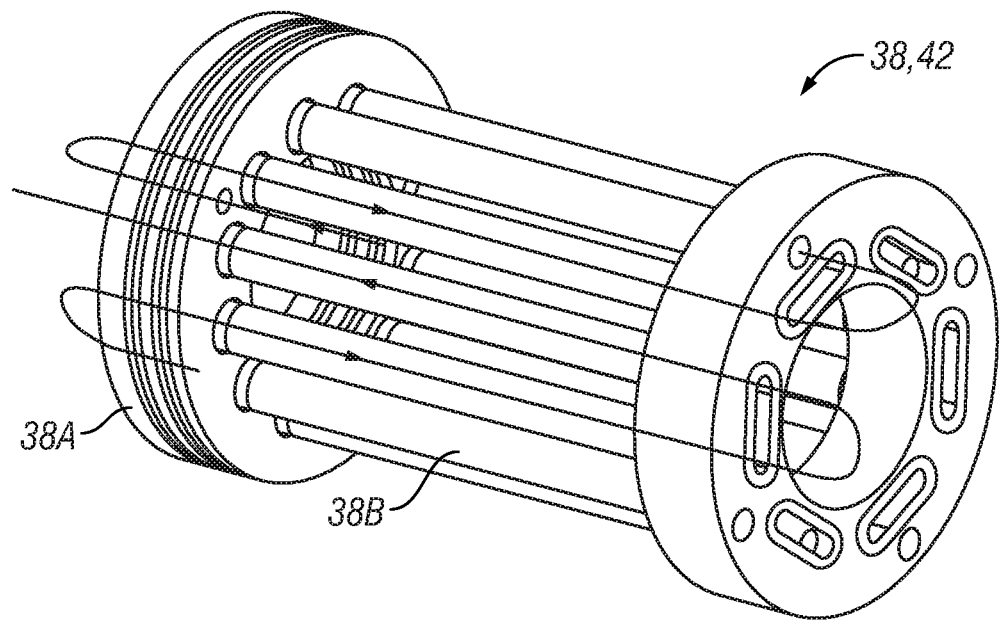
FIG. 3 shows example embodiments of upper and lower labyrinth inserts for the protector section shown in FIG. 2.
Figure 4:
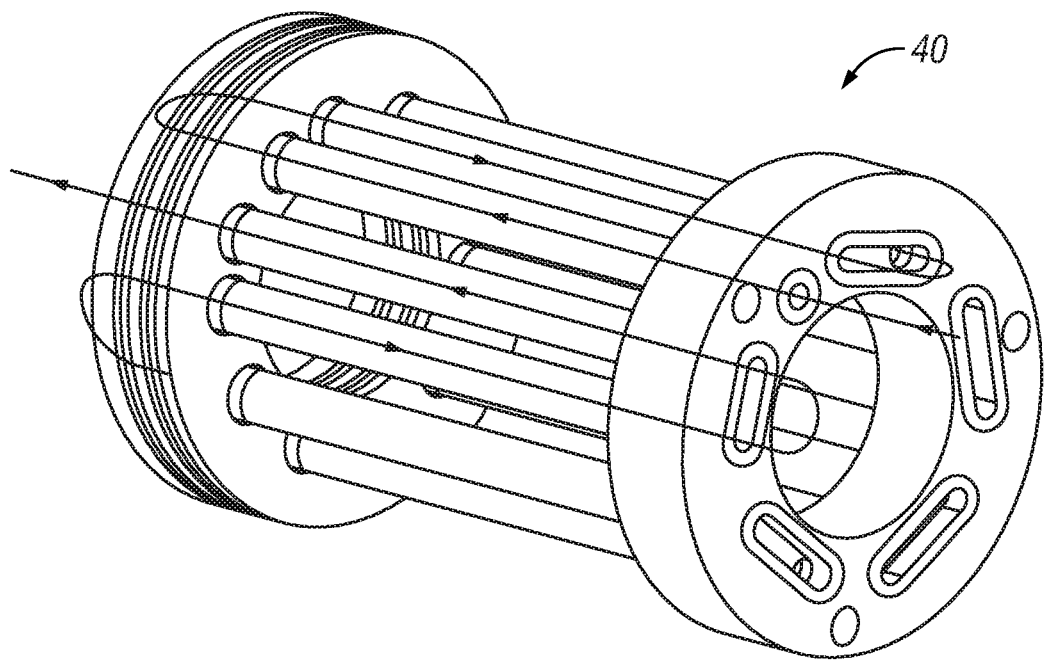
FIG. 4 shows an example center labyrinth section.

Example labyrinth tube sections are shown in FIG. 3 for the upper 38 and lower 42 labyrinth sections, respectively. The foregoing labyrinth sections 38, 42, enable filling an annular space between the outer housing (30 in FIG. 2) and the inner tube 30 longitudinally adjacent the upper 38 and lower 42 labyrinth sections. Such volume filling of the annular space (30 in FIG. 2) substantially increases the enclosed volume of dielectric fluid in the labyrinth tube section, correspondingly slowing migration of well fluid through the labyrinth seal section (26A in FIG. 2) and ultimately to the remainder of the protector (26 in FIG. 1) and then to the motor (14 in FIG. 1). The center labyrinth tube section 40, shown separately in FIG. 4, may comprise a vent (see 41 in FIG. 2) wherein fluid displaced from the annular space moves into the interior of the inner tube 30 so as to improve cooling of the rotary motion transmission (e.g., a flexible shaft or as shown at 16 in FIG. 1). Having a vent or similar feature to enable displaced fluid movement into the inner tube 30 allows access to the protector 18 for cooling the fluid surrounding the shaft 16. This may be important because the volume surrounding the shaft 16 is small and therefor experiences lubricant fluid heating resulting from motion across mechanical seal faces, radial bearings and fluid churning as a result of the shaft 16 spinning at high speed. The volume surrounding the shaft is otherwise well insulated from any cooling effect; providing a mechanism to move lubricating fluid into the inner tube 30 can reduce adverse effects of such insulation.

Figure 4A:
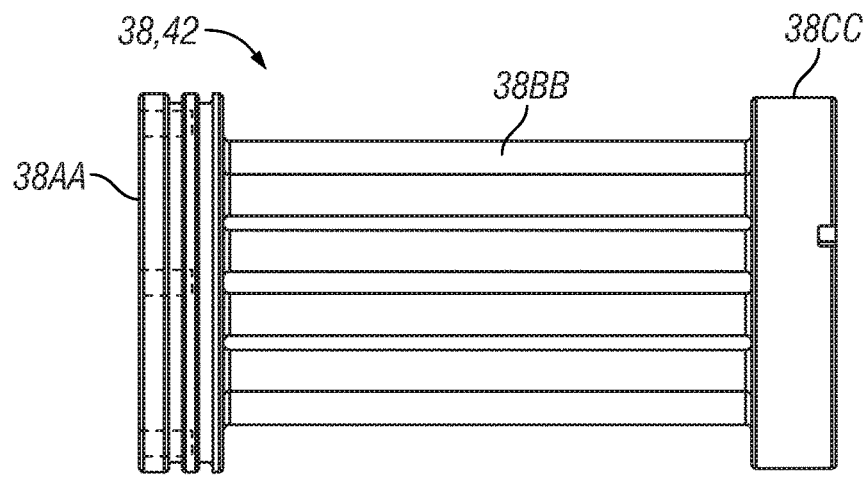
FIGS. 4A, 4B and 4C show another embodiment of a labyrinth section.
Figure 4B:
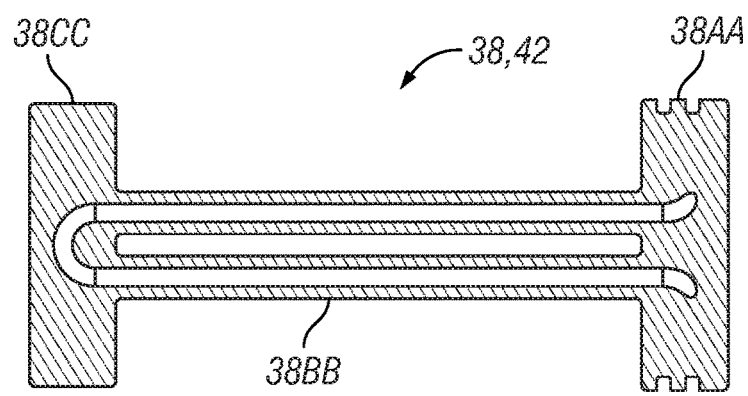
Figure 4C:
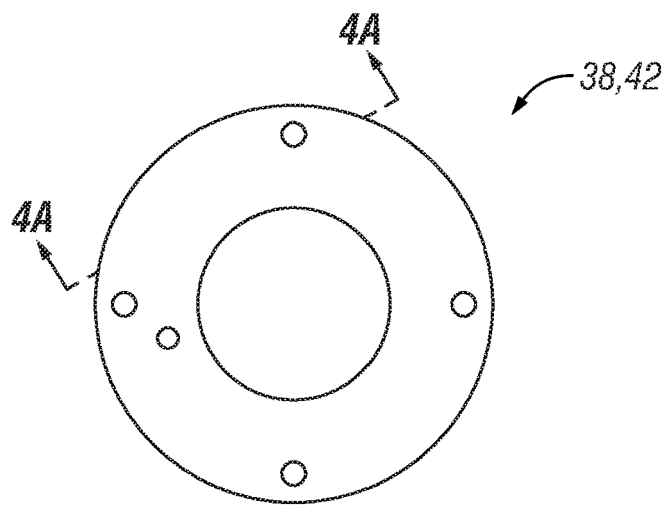

FIGS. 4A, 4B and 4C show, respectively, another example embodiment of one of the labyrinth tube sections (e.g., 38 and 42 in FIG. 2). A side view shown in FIG. 4A includes an end plate 38AA and 38CC on respective longitudinal ends of labyrinth tubes 38BB. In the present example embodiment, the labyrinth tubes 38BB may be formed integrally with the end plates 38AA, 38CC, for example by three dimensional printing. A cross section of integrally formed labyrinth tubes 38BB and end plates 38AA, 38CC is shown in FIG. 4B. Location of the cross-section shown in FIG. 4B is illustrated in FIG. 4C. A possible advantage of a labyrinth tube section made as shown in FIGS. 4A, 4B and 4C is that end seals or gaskets used to seal the end to end coupling between adjacent labyrinth tube sections may be reduced in number or eliminated.

Figure 2A:
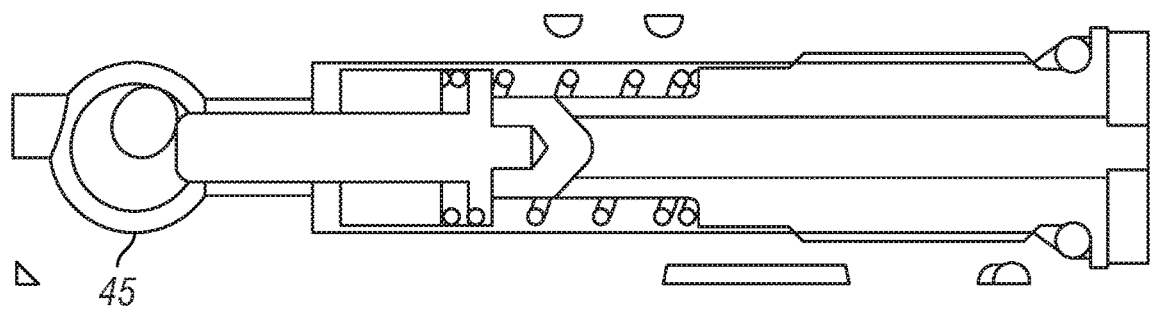
FIGS. 2A, 2B and 2C show example isolation valves that may be used in some embodiments.
Figure 2B:
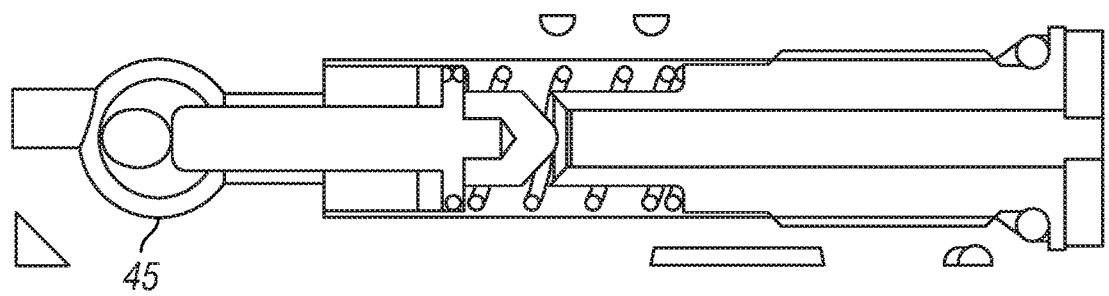
Figure 2C:
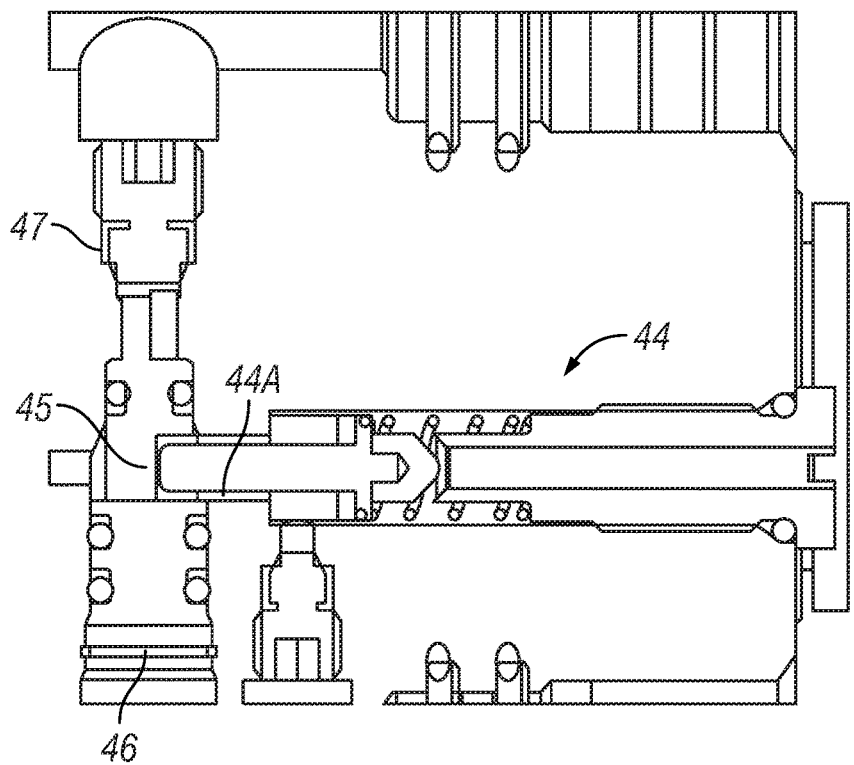

FIGS. 2A and 2B show, respectively, one of the isolation valves 44 in the closed position and in the open position. FIG. 2C shows an example isolation valve operating mechanism, which may comprise a cam 45 in contact with an operating rod 44A of the isolation valve 44. The cam 45 may be formed in, connected to or be otherwise part of a valve control shaft 47 which may sealingly engage in a bore in one side of the adapter sub (32 in FIG. 2) or the connector sub (34 in FIG. 2). The valve control shaft 47 may comprise a tool receptacle 46, for example, a hexagonally shaped opening or keyway to enable the valve control shaft 47 to be rotated with a hex key or similar tool. Other types of features to engage a tool with the valve control shaft 47 to enable rotation of the shaft will be readily understood to be equally usable by those skilled in the art.

Figure 5:
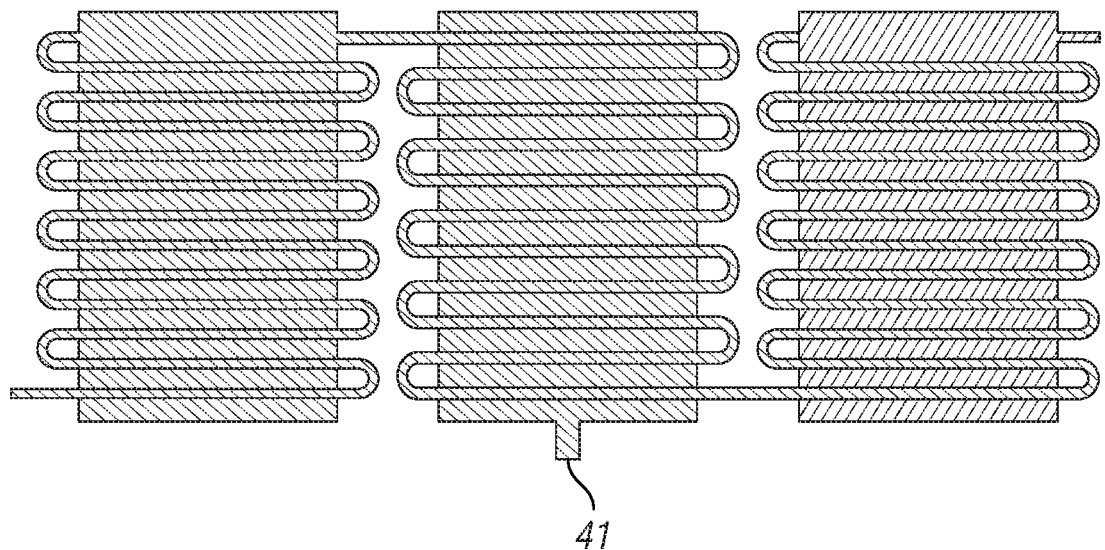
FIGS. 5 through 11 show progression of well fluid through the labyrinth seal section over time as the well fluid displaces dielectric fluid in the labyrinth seal section.
Figure 6:
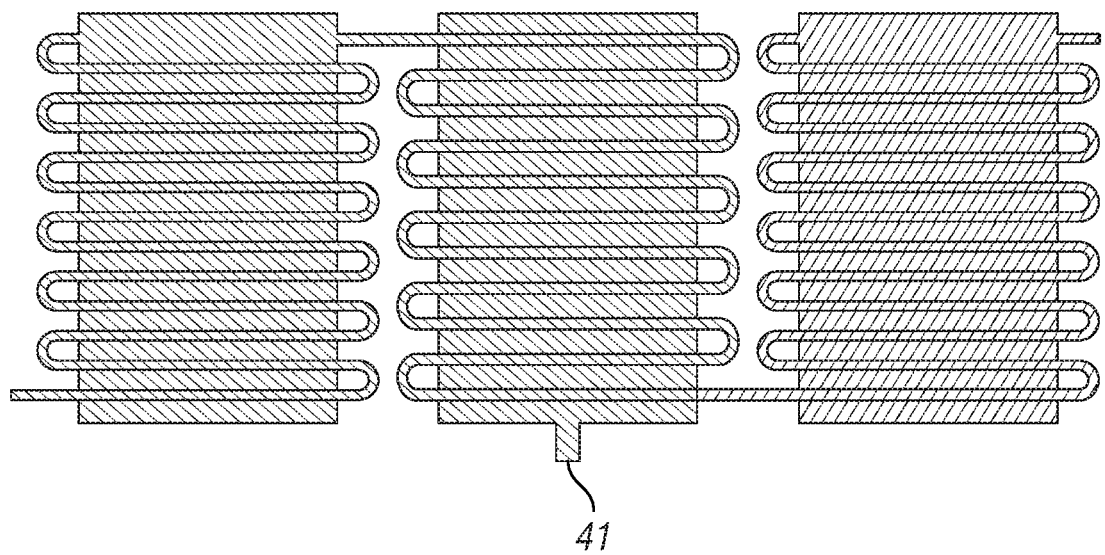
Figure 7:
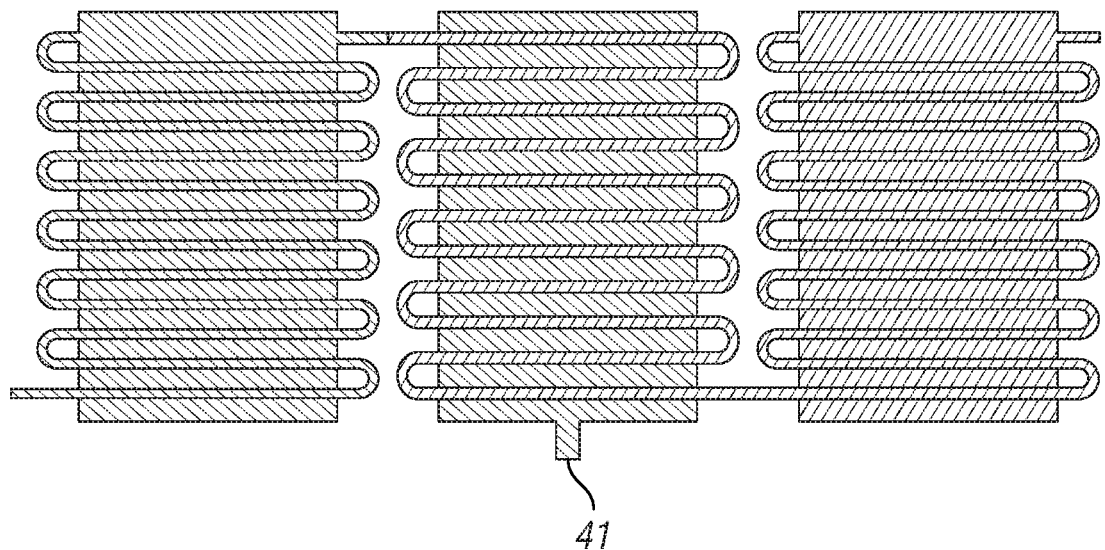
Figure 8:
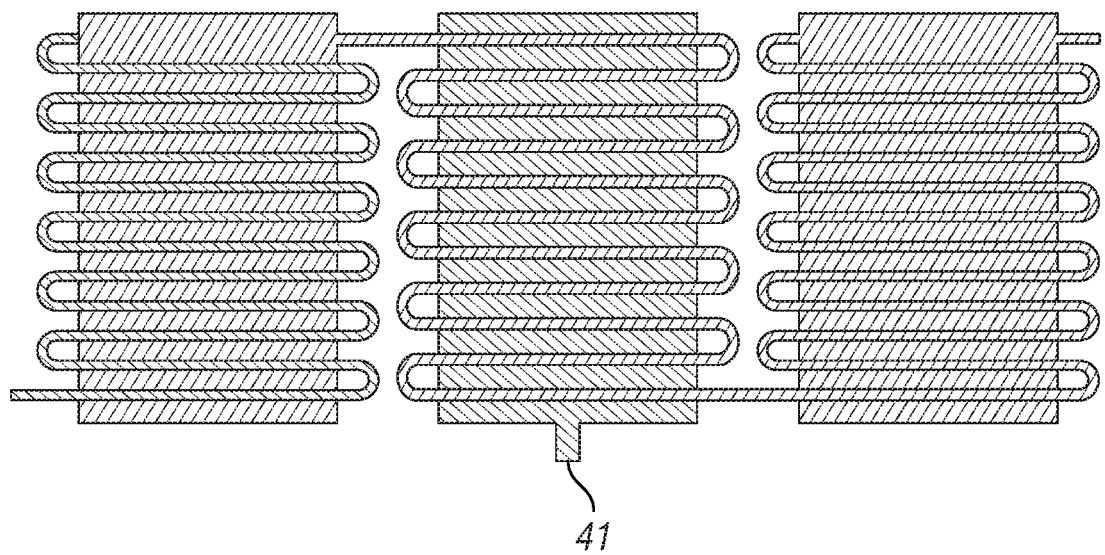
Figure 9:
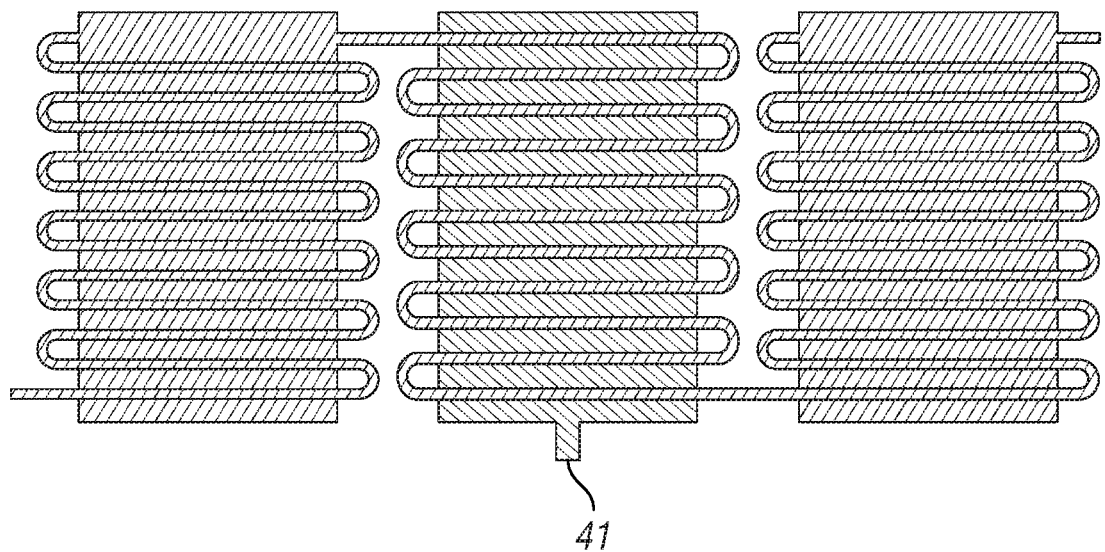
Figure 10:
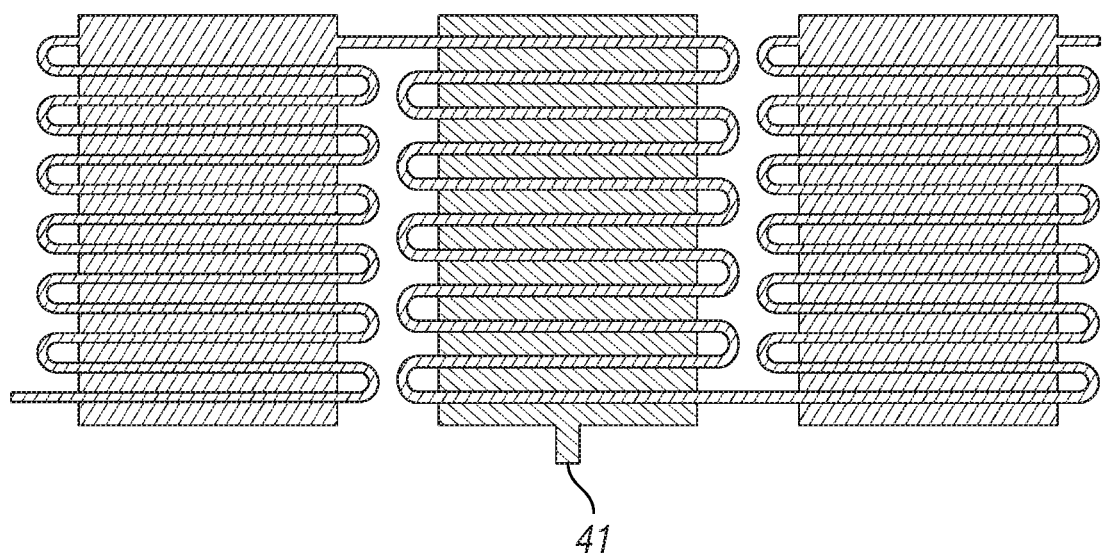
Figure 11:
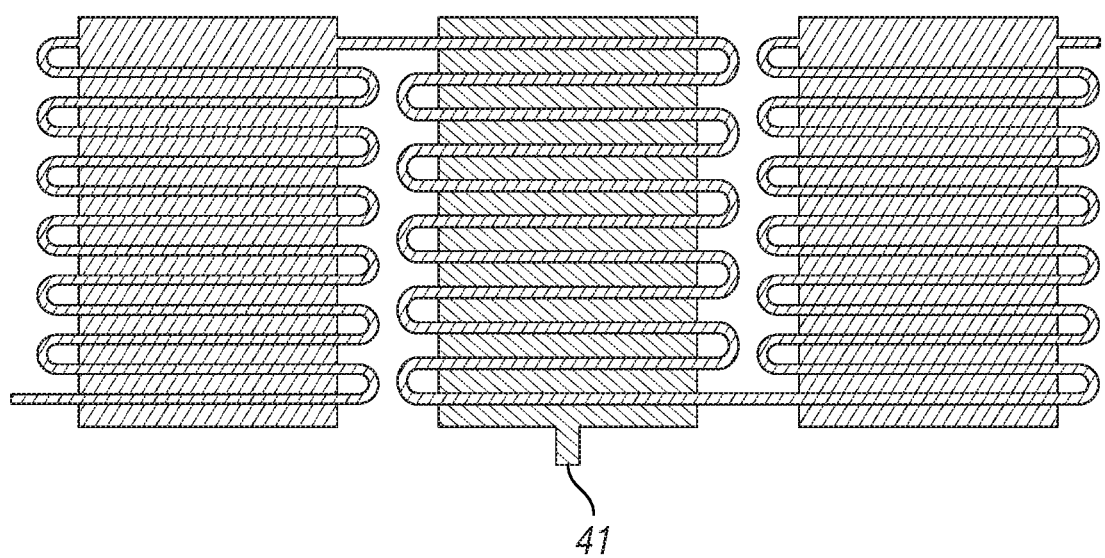

FIGS. 5 through 11 show progressive migration over time of well fluid into the labyrinth seal section. In FIG. 5, the labyrinth seal section 26A is completely filled with dielectric fluid. In FIG. 6, the well fluid may first enter the annular space adjacent the third labyrinth tube section (42 in FIG. 2). In FIG. 7, the well fluid then enters the labyrinth tubes of the third labyrinth tube section (42 in FIG. 2). In FIG. 8, the well fluid subsequently migrates only into the labyrinth tubes of the center labyrinth tube section (40 in FIG. 2), thus leaving the annular space filled with dielectric fluid for venting through the vent (41 in FIG. 2). In FIG. 9, the well fluid subsequently enters the upper labyrinth tube section (38 in FIG. 2) annular space. In FIG. 10, the well fluid then enters the upper labyrinth tube section's (38 in FIG. 2) labyrinth tubes. Finally, in FIG. 11, well fluid has entirely filled the labyrinth seal section 26A, whereupon the ESP system (10 in FIG. 1) may require removal from the well for servicing.

Although only a few examples have been described in detail above, those skilled in the art will readily appreciate that many modifications are possible in the examples. Accordingly, all such modifications are intended to be included within the scope of this disclosure as defined in the following claims.

What is claimed is:
1. A labyrinth seal section for a submersible pump, comprising:

an outer housing having a coupling sealingly engaged to the outer housing at each longitudinal end of the outer housing;
an inner tube sealingly engaged at each end to a respective one of the couplings to define a sealed annular space between the outer housing and the inner tube;
a plurality of labyrinth tube sections disposed in the sealed annular space, each labyrinth tube section comprising labyrinth tubes engaged with longitudinal end plates;
wherein a plurality of the labyrinth tube sections are configured to enable movement of fluid through the labyrinth tubes and spaces external to the labyrinth tubes and between the end plates so as to fill the annular space;
wherein one of the labyrinth tube sections constrains fluid to move only within the labyrinth tubes and wherein the inner tube between the end plates of the one of the labyrinth tube sections comprises a fluid port into an interior of the inner tube; and
wherein the labyrinth seal section further comprises an isolation valve at each longitudinal end of the outer housing and in fluid communication with a labyrinth tube at each longitudinal end of the labyrinth tube sections, the isolation valves opened to fill the section with dielectric fluid in the annular space and in the labyrinth tubes.

2. The section of claim 1, wherein the isolation valves are closable to enable connection of the section to a protector and/or to a motor without introducing air into the annular space or the labyrinth tubes.

3. The section of claim 1, wherein the isolation valves are operable by rotating a shaft having a cam in contact with an operating rod associated with each isolation valve.

4. The section of claim 3, wherein the shaft comprises a keyway for an operating tool.

5. The method of claim 3 wherein the isolation valves are closable to enable connection of the section to the protector and/or to the motor without introducing air into the annular space or the labyrinth tubes.

6. The method of claim 3, wherein operating the isolation valves comprises rotating a shaft having a cam in contact with an operating rod associated with each isolation valve.

7. The method of claim 6 wherein the shaft comprises a keyway for an operating tool.

8. The section of claim 1, wherein each longitudinal end of the section is coupled to one of a submersible pump protector, a submersible pump or a submersible pump motor.

9. The section of claim 1, wherein the labyrinth tube sections comprise integrally formed labyrinth tubes and longitudinal end plates.

10. An electric submersible pump, comprising:
a motor connected by a transmission to a pump;
a segmented housing enclosing the motor and the pump;
a protector disposed between the motor and the pump, the protector comprising a labyrinth seal section, the labyrinth seal section comprising a plurality of labyrinth tube sections disposed in an annular space between a part of the segmented housing and an inner tube, wherein at least one of the labyrinth tube sections is configured to cause fluid flow within labyrinth tubes and within the annular space external to the labyrinth tubes, and wherein one of the labyrinth tube sections constrain fluid to move only within the labyrinth tubes and the inner tube between end plates of the one of the labyrinth tube sections comprises a fluid port into an interior of the inner tube; and
wherein the labyrinth seal section further comprises an isolation valve at each longitudinal end of the labyrinth seal section and in fluid communication with a labyrinth tube at each longitudinal end of the labyrinth seal section, the isolation valves opened to fill the labyrinth seal section with dielectric fluid in the annular space and in the labyrinth tubes.

11. The pump of claim 10, wherein the isolation valves are closable to enable connection of the section to the protector and/or to the motor without introducing air into the annular space or the labyrinth tubes.

12. The pump of claim 10, wherein the isolation valves are operable by rotating a shaft having a cam in contact with an operating rod associated with each isolation valve.

13. The pump of claim 12 wherein the shaft comprises a keyway for an operating tool.

14. The pump of claim 10, wherein the labyrinth tube sections comprise integrally formed labyrinth tubes and longitudinal end plates.

15. A method for pumping fluid, comprising:
rotating a motor connected by a transmission to a pump, the motor and the pump disposed in a housing, the housing comprising, a protector disposed between the motor and the pump, the protector comprising a labyrinth seal section, the labyrinth seal section comprising a plurality of labyrinth tube sections disposed in an annular space between a part of the segmented housing and an inner tube, wherein the plurality of labyrinth tube sections are configured to enable movement of fluid through the labyrinth tube sections and spaces external to the labyrinth tubes and between end plates so as to fill the annular space;
opening an isolation valve at each longitudinal end of the labyrinth seal section and in fluid communication with a labyrinth tube at each longitudinal end of the labyrinth seal section to fill the labyrinth seal section with dielectric fluid in the annular space and in the labyrinth tubes; and
moving the dielectric fluid from at least one of the labyrinth tube sections, the at least one of the labyrinth tube sections constraining fluid to move only within the labyrinth tube section, and through a fluid port in said labyrinth tube section into an interior of the inner tube to cool components of the transmission disposed within the inner tube.

\* \* \* \* \*